United States Patent
Rigal et al.

(10) Patent No.: US 10,457,174 B2
(45) Date of Patent: Oct. 29, 2019

(54) FORMING OF MOTOR VEHICLE SEAT UPHOLSTERY

(71) Applicant: Faurecia Sieges D'Automobile, Nanterre (FR)

(72) Inventors: Olivier Rigal, Etampes (FR); Fabrice Etienne, Belfort (FR); Benoit Gazaniol, Arpajon (FR); Carlos Kochinski, Curitiba (BR)

(73) Assignee: Faurecia Sieges D'Automobile, Nanterre (FR)

( * ) Notice: Subject to any disclaimer, the term of this patent is extended or adjusted under 35 U.S.C. 154(b) by 268 days.

(21) Appl. No.: 14/908,247

(22) PCT Filed: Aug. 1, 2014

(86) PCT No.: PCT/FR2014/052012
§ 371 (c)(1),
(2) Date: Jan. 28, 2016

(87) PCT Pub. No.: WO2015/015132
PCT Pub. Date: Feb. 5, 2015

(65) Prior Publication Data
US 2016/0167552 A1   Jun. 16, 2016

(30) Foreign Application Priority Data

Aug. 2, 2013 (FR) .................................... 13 57722

(51) Int. Cl.
*B60N 2/58* (2006.01)
*B29C 37/00* (2006.01)
(Continued)

(52) U.S. Cl.
CPC ............ *B60N 2/58* (2013.01); *B29C 37/0057* (2013.01); *B29C 43/003* (2013.01);
(Continued)

(58) Field of Classification Search
CPC ...... B60N 2/58; B60N 2/5891; B60N 2/7017; B29C 37/0057; B29C 43/003;
(Continued)

(56) References Cited

U.S. PATENT DOCUMENTS 4,060,280 A   11/1977   Van Loo
4,247,346 A   1/1981    Maehara et al.
(Continued)

FOREIGN PATENT DOCUMENTS

CN   1225058 A   8/1999
CN   1723312 A   1/2006
(Continued)

OTHER PUBLICATIONS

"International Search Report and Written Opinion of the International Searching Authority", dated Jan. 22, 2015, International Application PCT/FR2014/052012, 10 pp.
(Continued)

*Primary Examiner* — Stella K Yi
(74) *Attorney, Agent, or Firm* — Kaplan Breyer Schwarz, LLP

(57) ABSTRACT

The invention concerns a mold for forming an element for covering a lining of a seat member for a motor vehicle, comprising: a matrix (62) provided with ribs (624) for defining style extension lines (36); and a punch (64) provided with ribs (642), to either side of a line of the ribs (624) of the matrix (62).

14 Claims, 7 Drawing Sheets

(51) Int. Cl.
  *B29D 99/00* (2010.01)
  *B29C 44/56* (2006.01)
  *B60N 2/70* (2006.01)
  *B29C 43/00* (2006.01)
  *B29C 43/02* (2006.01)
  *B29C 43/18* (2006.01)
  *B29L 31/58* (2006.01)
  *B29C 33/42* (2006.01)
  *B29L 31/00* (2006.01)
  *B29K 105/04* (2006.01)

(52) U.S. Cl.
  CPC .......... *B29C 43/021* (2013.01); *B29C 43/184* (2013.01); *B29C 44/569* (2013.01); *B29D 99/0092* (2013.01); *B60N 2/5833* (2013.01); *B60N 2/5891* (2013.01); *B60N 2/7017* (2013.01); *B29C 33/42* (2013.01); *B29C 2043/023* (2013.01); *B29K 2105/04* (2013.01); *B29L 2031/58* (2013.01); *B29L 2031/771* (2013.01)

(58) Field of Classification Search
  CPC ... B29C 43/021; B29C 43/184; B29C 44/569; B29C 44/0446; B29C 33/42; B29D 99/0092; B29L 2031/58
  See application file for complete search history.

(56) References Cited

U.S. PATENT DOCUMENTS

| | | | |
|---|---|---|---|
| 4,247,347 | A | 1/1981 | Lischer et al. |
| 4,247,348 | A | 1/1981 | Lischer |
| 4,264,386 | A | 4/1981 | Sears, Jr. et al. |
| 4,287,143 | A | 9/1981 | Sears, Jr. et al. |
| 4,288,499 | A | 9/1981 | Kielbania, Jr. |
| 4,470,857 | A | 9/1984 | Casalou |
| 4,772,070 | A | 9/1988 | Leto, Jr. et al. |
| 4,792,111 | A | 12/1988 | Taguchi |
| 4,795,517 | A | 1/1989 | Elliott et al. |
| 4,829,644 | A | 5/1989 | Kondo et al. |
| 4,831,697 | A | 5/1989 | Urai |
| 4,883,320 | A | 11/1989 | Izunida et al. |
| 4,892,891 | A | 1/1990 | Close |
| 4,894,277 | A | 1/1990 | Akasaki |
| 4,927,209 | A | 5/1990 | Maruyama |
| 5,000,805 | A | 3/1991 | Lowe |
| 5,283,918 | A | 2/1994 | Weingartner et al. |
| 5,462,786 | A | 10/1995 | Van Ert |
| 5,477,572 | A | 12/1995 | Weingartner et al. |
| 5,632,053 | A | 5/1997 | Weingartner et al. |
| 5,669,670 | A | 9/1997 | Haraguchi et al. |
| 5,830,548 | A | 11/1998 | Andersen et al. |
| 6,004,498 | A | 12/1999 | Fujii et al. |
| 6,471,908 | B1 | 10/2002 | Beckmann |
| 6,842,950 | B2 | 1/2005 | Fleuchaus et al. |
| 6,892,433 | B2 | 5/2005 | Barry et al. |
| 7,056,457 | B2 | 6/2006 | Senoo |
| 7,481,489 | B2 | 1/2009 | Demick |
| 7,487,575 | B2 | 2/2009 | Smith |
| 7,823,980 | B2 | 11/2010 | Niwa et al. |
| 7,837,263 | B2 | 11/2010 | Booth et al. |
| 7,946,649 | B2 | 5/2011 | Galbreath et al. |
| 8,099,837 | B2 | 1/2012 | Santin et al. |
| 8,191,971 | B2 | 6/2012 | Lovasz |
| 8,522,406 | B2 | 9/2013 | Voigt |
| 8,647,544 | B2 | 2/2014 | Burch |
| 8,794,708 | B2 | 8/2014 | Besnard et al. |
| 2002/0101109 | A1 | 8/2002 | Stiller et al. |
| 2003/0215601 | A1 | 11/2003 | Pedde et al. |
| 2003/0228455 | A1 | 12/2003 | Panozyk et al. |
| 2004/0109992 | A1 | 6/2004 | Gribble et al. |
| 2005/0006944 | A1 | 1/2005 | Ali et al. |
| 2005/0081771 | A1 | 4/2005 | Kromm et al. |
| 2006/0141260 | A1 | 6/2006 | Haque et al. |
| 2008/0224509 | A1 | 9/2008 | Demick |
| 2008/0258523 | A1 | 10/2008 | Santin et al. |
| 2008/0309143 | A1 | 12/2008 | Booth et al. |
| 2009/0075084 | A1 | 3/2009 | Kochi et al. |
| 2009/0085384 | A1 | 4/2009 | Galbreath et al. |
| 2009/0295215 | A1 | 12/2009 | Galbreath et al. |
| 2009/0302664 | A1 | 12/2009 | Galbreath et al. |
| 2010/0041780 | A1 | 2/2010 | Friedrich et al. |
| 2011/0059667 | A1 | 3/2011 | Meyer et al. |
| 2011/0187176 | A1* | 8/2011 | Besnard ............... B29C 44/04 297/452.48 |
| 2015/0230564 | A1 | 8/2015 | Fujisawa et al. |
| 2016/0167260 | A1 | 6/2016 | Thomas et al. |
| 2016/0304014 | A1 | 10/2016 | Lelievre et al. |
| 2016/0368405 | A1 | 12/2016 | Ishii et al. |

FOREIGN PATENT DOCUMENTS

| | | |
|---|---|---|
| EP | 0387230 A1 | 9/1990 |
| EP | 0396305 A2 | 11/1990 |
| EP | 0618169 A2 | 10/1994 |
| FR | 2785580 A1 | 5/2000 |
| FR | 2939731 * | 6/2010 |
| FR | 2939731 A1 | 6/2010 |
| FR | 2941657 A1 | 8/2010 |
| GB | 2006667 A | 5/1979 |
| GB | 2343408 A | 5/2000 |
| JP | 2008022982 * | 2/2008 |
| JP | 2010214997 A | 9/2010 |
| WO | 9114566 A1 | 10/1991 |
| WO | 98/02331 A1 | 1/1998 |
| WO | 2010010281 A2 | 1/2010 |
| WO | 20150015131 A1 | 2/2015 |
| WO | 20150015132 A2 | 2/2015 |

OTHER PUBLICATIONS

"French Search Report", dated Feb. 25, 2016, French Patent Application No. FR1553404, 2 pp.
"Office Action", U.S. Appl. No. 13/055,510, filed Apr. 11, 2011, dated Jun. 13, 2013, 9 pp.
"Office Action", U.S. Appl. No. 13/055,510, filed Apr. 11, 2011, dated Jul. 26, 2013, 13 pp.
"Office Action", U.S. Appl. No. 13/055,510, filed Apr. 11, 2011, dated Dec. 18, 2013, 10 pp.
"Notice of Allowance", U.S. Appl. No. 13/055,510, filed Apr. 11, 2011, dated Mar. 31, 2014, Mar. 31, 2014, 8 pp.
Officer Beate Giffo-Schmitt, "International Preliminary Report on Patentability", International Patent Application PCT/FR2009/051434, dated Mar. 1, 2011, 8 pp.
Officer David Molenaar, "International Search Report and Written Opinion", International Patent Application PCT/FR2009/052011, dated Sep. 22, 2014, 10 pp.
Officer David Molenaar, "Written Opinion of the International Searching Authority", dated Jan. 4, 2016, International Patent Application No. PCT/FR2014/052012, 7 pp.
Officer Jean Lanaspeze, "International Search Report", International Patent Application PCT/FR2009/051434, dated Jan. 25, 2010, 6 pp.
"International Search Report", issued in International Application PCT/FR2014/052012 dated Jan. 22, 2015.
"Non-Final Office Action", U.S. Appl. No. 15/099,329, dated Aug. 18, 2017, 5 pp.
Officer David Molenaar, "International Search Report and Written Opinion", International Patent Application PCT/FR2014/052011, dated Sep. 22, 2014, 10 pp.
"Office Action—Restriction" issued in related U.S. Appl. No. 14/907,950, dated Aug. 11, 2017.
"Non-Final Office Action" issued in related U.S. Appl. No. 14/907,950, dated Jan. 3, 2018.
"Final Office Action" issued in related U.S. Appl. No. 15/099,329, dated Dec. 20, 2017.
"Notice of Allowance" dated Mar. 29, 2018 issued in U.S. Appl. No. 15/099,329.

(56) References Cited

OTHER PUBLICATIONS

Notice of Allowance and Fees Due (PTOL-85) dated Jul. 23, 2018 for U.S. Appl. No. 14/907,950.

* cited by examiner

FORMING OF MOTOR VEHICLE SEAT UPHOLSTERY

The present patent application claims the priority benefit of French patent application FR13/57722 which is herein incorporated by reference.

BACKGROUND

The present disclosure generally relates to motor vehicle seats and, more specifically, to the forming of upholstery for a seat element (seat bottom piece, backrest, headrest, armrests).

DISCUSSION OF THE RELATED ART

It has already been provided, for example, in document WO-A-2010/010281, to form upholstery for a motor vehicle seat in the form of a foam support block adapted to a frame element of the seat having a cover element formed by cold forming of a foam sprayed on a polypropylene substrate and placed on the reverse side of a textile, skin, or synthetic material, to define the visible shape of the seat element.

Document U.S. Pat. No. 6,004,498 describes a method of molding resin on skin pieces to form an instrument panel, a console, or a vehicle door cladding.

Document U.S. Pat. No. 5,462,786 describes a method of forming inner panels for a vehicle by mean of a press.

Document FR-A-2941657 describes a vehicle seat backrest comprising a covering complex and a method of forming such a backrest.

SUMMARY

An embodiment aims at improving the forming of upholstery for motor vehicle seats.

An embodiment aims at providing a solution improving the aspect of the cover element.

An embodiment aims at providing a solution particularly adapted to a skin covering, for example, of leather type.

An embodiment aims at improving the forming of style features in the upholstery.

An embodiment aims at providing tools for forming a seat upholstery cover element.

Thus, an embodiment provides a method of forming at least one style feature line in a cover element for seat upholstery, comprising the steps of:

depositing foam in the viscous state on a support element;

polymerizing the foam by placing the assembly of the foam and of the support element in a mold having a matrix comprising at least one rib for defining the style feature line and having a punch comprising ribs on either side of the line opposite the matrix rib.

According to an embodiment, the support element and the foam extend on either side of the rib of the matrix.

According to an embodiment, the foam extends on either side of the ribs of the punch.

According to an embodiment, the support element and the foam fill the entire cavity of the mold at the level of the ribs.

According to an embodiment, the support element and the foam fill the entire cavity of the mold.

According to an embodiment, the assembly is placed in the mold with the support element on the matrix side.

According to an embodiment, a first spacing between the punch and the matrix in line with two ribs of the punch surrounding a rib of the matrix is smaller than a second spacing between the punch and the matrix outside of the two punch ribs.

According to an embodiment, the spacing between the punch and the matrix between the two ribs of the punch is constant.

According to an embodiment, the spacing between the punch and the matrix in line with the rib of the matrix is between the first and second spacings.

According to an embodiment, the first spacing is in the range from 2 to 3 mm.

According to an embodiment, the second spacing is greater than 2.5 mm, preferably in the range from approximately 2.5 to 13 mm.

An embodiment also provides a mold for forming a cover element of upholstery of a motor vehicle seat element, comprising:

a matrix provided with at least one rib for defining style feature lines; and a punch provided with ribs, on either side of the line opposite each rib of the matrix.

According to an embodiment, in closed position of the mold, the ridge of the ribs of the matrix is between the ribs of the punch.

According to an embodiment, the height of the bottom of the punch is identical on either side of its ribs.

According to an embodiment, the height of the punch ribs defines the thickness of a foam region placed against a cap at least made of a covering material.

According to an embodiment, the spacing between the punch ribs as well as the curvature of the internal surface of the punch are selected according to the aspect and to the texture desired at the level of the style feature lines.

An embodiment also provides a cover element for motor vehicle seat upholstery, comprising:

a cap formed at least of a covering material; and a first foam layer, the thickness of the first foam layer being, on either side of the style feature lines, smaller than its thickness outside of style feature lines.

According to an embodiment, the cover element further comprises a second slit foam layer at the back side of the first layer.

According to an embodiment, the cover element further comprises a polyethylene film at the back side of the second layer.

According to an embodiment, the cover element further comprises a woven or nonwoven textile.

According to an embodiment, said cap comprises a covering material.

An embodiment also provides motor vehicle seat upholstery comprising a foam support block and a cover element.

BRIEF DESCRIPTION OF THE DRAWINGS

The foregoing and other features and advantages of the present invention will be discussed in detail in the following non-limiting description of specific embodiments in connection with the accompanying drawings, among which.

DETAILED DESCRIPTION

Figure 1:
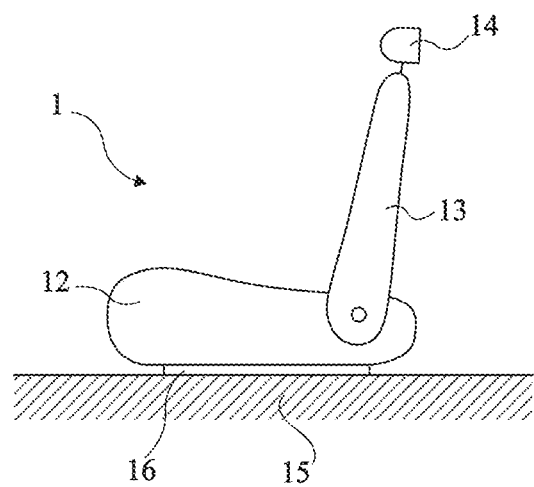
FIG. 1 is a simplified lateral view of a motor vehicle seat.

The same elements have been designated with the same reference numerals in the different drawings, which have been drawn out of scale. For clarity, only those steps and elements which are useful to the understanding of the present invention have been shown and will be described. In particular, the forming of other seat portions than the upholstery has not been detailed, the invention being compatible with any conventional forming of upholstery placed on a frame.

In the following description, when reference is made to terms qualifying absolute positions such as "front", "rear", "top", "bottom", "left", "right", etc., or relative positions, such as "above", "under", "upper", "lower", etc., or to terms qualifying directions, it is referred to a seat in a normal position of use in the usual vehicle motion direction. Unless otherwise specified, expressions approximately, substantially, and in the order of mean to within 10%.

FIG. 1 is a simplified lateral view of a motor vehicle seat 1.

Such a seat comprises a seat bottom piece 12 having a backrest 13, most often topped with a headrest 14, jointed thereto. Seat bottom piece 12, backrest 13, and headrest 14 each comprise upholstery fastened to their frame, generally made of metal. Frame 16 of seat bottom piece 12 may be connected to floor 15 of the vehicle by a slide rail mechanism. Seat 1 may also comprise one or several armrests (not shown).

Motor vehicle seat upholstery generally appears in the form of a padding coated with a cap comprising, at the lower surface (not shown), a foam layer under the covering material (made of textile material, of skin, of a synthetic material, etc.).

Figure 2A:
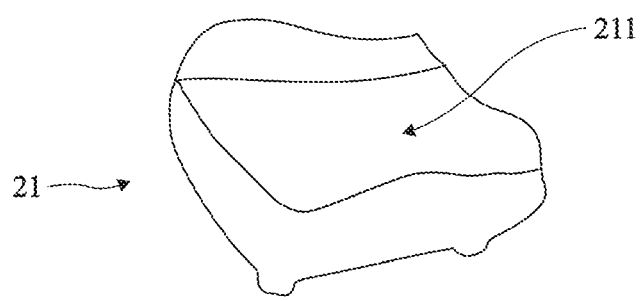
FIGS. 2A, 2B, and 2C are perspective views of upholstery of a seat element.
Figure 2B:
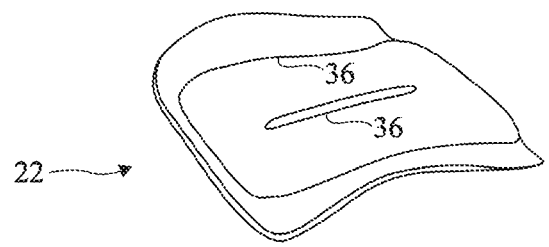
Figure 2C:
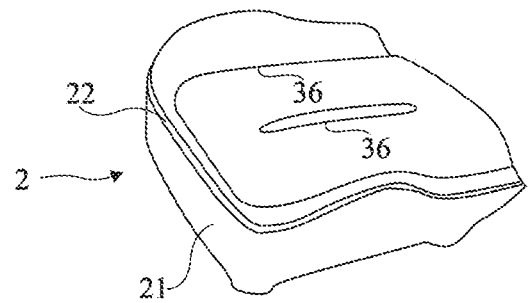

FIGS. 2A, 2B, and 2C are perspective views illustrating the forming of upholstery of a seat element (for example, of seat bottom piece 12).

A foam support block 21 (FIG. 2A) is formed with no style feature, and upper surface 211 of the foam block does not define the final visible shape of the seat bottom piece.

Support block 21 is intended to receive a cover element 22 (FIG. 2B) defining the final shape (imitating style feature lines 36) of the seat element.

Cover element 22 is intended to be placed (FIG. 2C) on block 21 to obtain the final upholstery of element 12. The fastening of element 22 to block 21 is performed, for example, by hook and loop straps (not shown) applied by gluing or overmolding at the surface of elements 22 and 21, which facilitates the replacing of the cover element in case it is worn off or defective. As a variation, element 22 is glued or snapped to block 21 or simply maintained in position by the upholstery stretching forces.

Lateral tucked panels or skirts (not shown in FIGS. 2A to 2C) taking part in the holding of element 22 on block 21 may also be provided. Such tucked panels are generally sewn to the edges of element 22.

Figure 3:
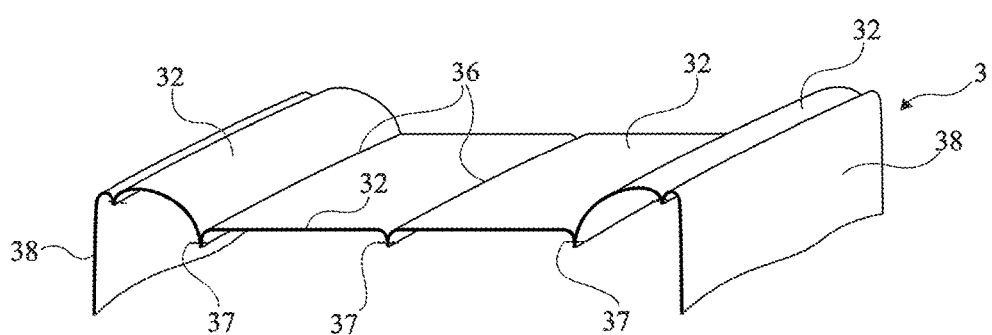
FIG. 3 is a simplified representation of an example of a cap.

FIG. 3 is a perspective cross-section view of an embodiment of a cap 3, intended to form part of cover element 22.

It is started by forming a visible layer (covering material) of cap 3 in the form of a covering 32 made of textile, plastic coated textile (vinyl), leather, split leather, various skins, or any other type of covering capable of forming the visible surface of seat upholstery. As an example, pieces of covering material 32 (for example, leather pieces) are assembled by sewing 37 along style feature lines 36. In the example of FIG. 3, optional lateral tucked panels or skirts 38 are provided.

Figure 4:
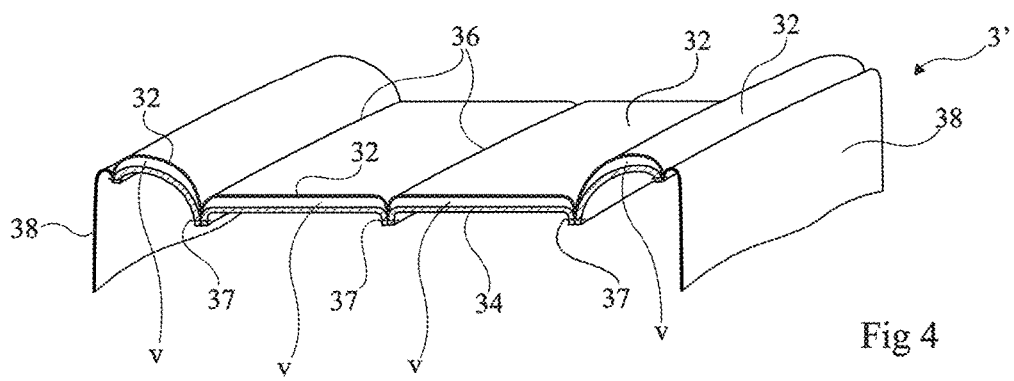
FIG. 4 is a simplified representation of another example of a cap.

FIG. 4 is a simplified representation of another embodiment of a cap 3.

According to this embodiment, a layer 34, forming, in a way, a barrier and which is assembled to covering 32 for example by gluing, by peripheral sewing of covering pieces 32, by flame treatment, etc., is provided.

Preferably, particularly for a skin covering 32, layer 34 is assembled only at the periphery of the skin pieces (at the level of style feature lines 36) so that skin 32 does not adhere to layer 34, which improves the aspect and the comfort.

Another function of layer 34, which will better appear from the description of the subsequent drawings, is to avoid for the foam which will be deposited (sprayed) at the back side of the cap to adhere to covering material 32, which preserves the flexibility and the feel of the covering material.

As a specific example, layer 34 may be slit polyurethane foam, having a thickness between approximately 1 mm and 20 mm and having a density in the range from 20 to 70 kg/m$^3$. A polyurethane film having a thickness between 15 microns and 80 microns, microperforated or not, may also be used.

In the presence of lateral tucked panels 38, said panels preferably comprise no barrier layer 34, as illustrated in FIG. 4.

The mechanical resistance of barrier layer 34 and/or of covering 32 may be improved by means of a knitted or woven textile mesh (not shown) having a relatively low weight per unit area (for example, between 20 and 150 g/m$^2$).

Figure 5A:
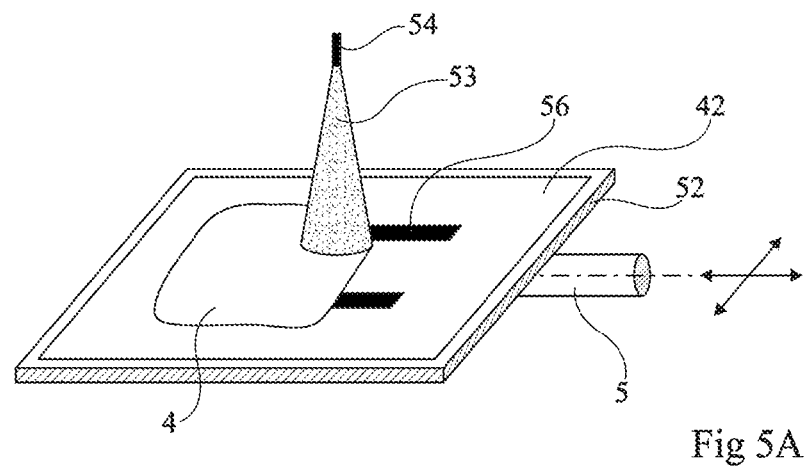
FIGS. 5A, 5B, and 5C are perspective cross-section views illustrating an embodiment of a cover element.
Figure 5B:
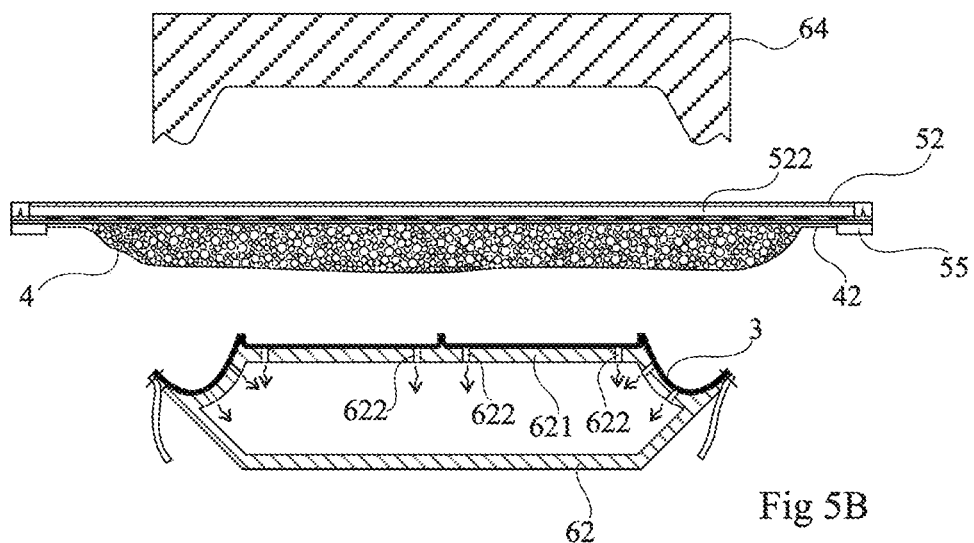
Figure 5C:
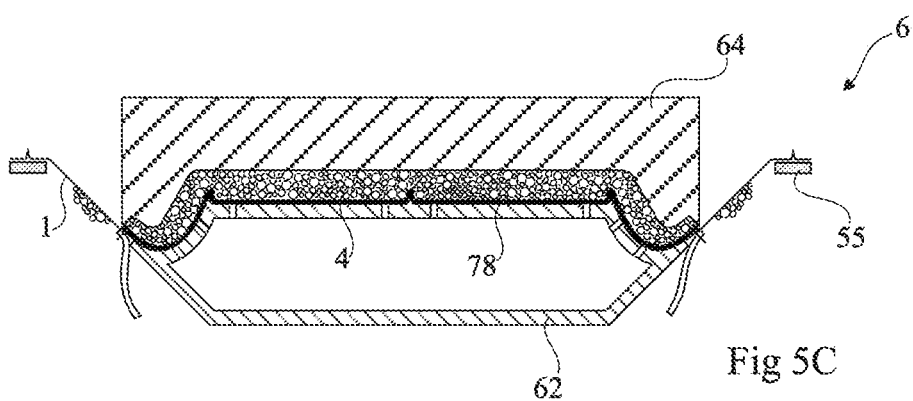

FIGS. 5A, 5B, and 5C are views respectively in perspective for FIG. 5A and in cross-section for FIGS. 5B and 5C illustrating steps of an example of the forming of cover element 22 from a cap 3. This example illustrates the specific case of the use of a mold having a matrix comprising a suction plate. However, such a suction function is optional and a method derived from that described in above-mentioned application WO-A2010/010281 may be used. Similarly, other caps than those of FIGS. 3 and 4 can be envisaged.

A substrate 42, for example, made of a polyethylene film, of a slit foam layer, of a woven or nonwoven textile, or of a stack of a plurality of these components, is placed on a suction plate 52 and is, for example, held in place by suction (symbolized by a suction arm 5 of a robotized element of the installation). Different embodiments of the substrate will be illustrated hereafter.

In this embodiment illustrated in FIG. 5A, it is provided to position, against substrate 42 and before spraying a foam layer 4, catching elements, for example, hook and loop straps 56 intended to subsequently cooperate with the support block to fasten the cover element. Foam 53 is sprayed (spray head 54) on a surface of substrate 42.

As illustrated in FIG. 5B, cap 3, for example, resulting from the embodiment illustrated in FIG. 3 or FIG. 4, is positioned against a first portion or matrix 62 of a mould for forming the cover element. Matrix 62 defines, by its surface or upper plate 621, the final shape desired for cover element 22 and has, in the shown example, the specificity of applying a suction (openings 622). Thus, cap 3 takes the shape of upper portion 621 of matrix 62 due to the suction, the cap being positioned with its visible surface (skin or textile) against plate 621. A peripheral holding (not shown) of cap 3 may be provided at the level of matrix 62, but preferably with no tension.

Plate 52 supporting, on substrate 42, layer 4 of sprayed foam is then inserted, with foam 4 on the side of cap 3, against matrix 62. Then, plate 52 is removed and a punch 64 closes the mold (FIG. 5C).

FIG. 5B illustrates the presence of suction channels 522 at the level of plate 52. In practice, when the plate is flipped before its transfer onto matrix 62, substrate 42 is pinched at the periphery by means of a frame 55, which eases handling operations. Once the plate has been flipped and positioned vertically above matrix 62, the suction is stopped, so that substrate 42 is no longer held. Thus, the assembly formed of substrate 42 and foam 4 is laid on matrix 62. Plate 52 is then removed and punch 64 may close the mould.

On closing of the mold (FIG. 5C), foam 4 is compressed by means of punch 64. In practice, the foam is compressed before being dried, that is, while it is in its sticky phase. According to the nature of the foam, this pressing is performed between approximately 15 seconds and 60 seconds after the end of the spraying. The time period for which mold 6 remains closed depends on the time period necessary to dry the foam. Typically, this time period is in the range from 50 to 90 seconds to be able to easily unmold the part.

Once the cover element has been unmolded, polyethylene film 42 is preferably removed, particularly to make optional straps 56 accessible, before placing cover element 22 on support block 21.

The shape of punch 64 defines the surface of the cover element, intended to bear against the support block (21, FIG. 2A). Thus, matrix 62 defines the visible surface of cover element 22 while punch 64 defines the back side thereof. The space between matrix 62 and punch 64 defines the final thickness of cover element 22 and, in particular, of its foam layer 4.

Figure 6:
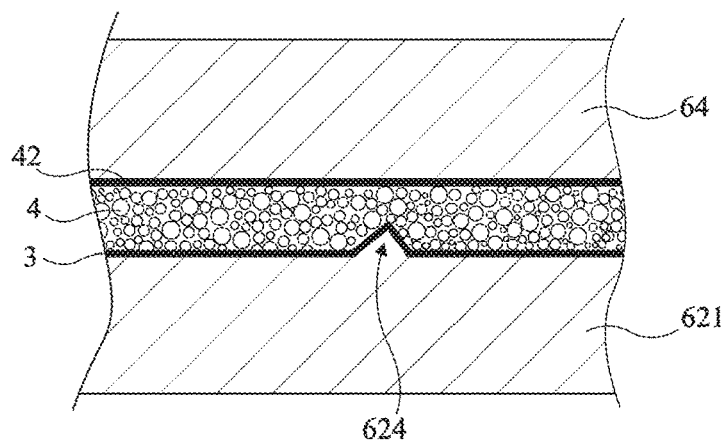
FIG. 6 is a partial cross-section view illustrating a detail of a mold for forming a cover element.

FIG. 6 is a partial cross-section view illustrating a detail of a mold for forming a cover element.

This drawing illustrates the forming at the level of a style feature line. Plate 621 of matrix 62 comprises a rib 624 following the desired pattern for the style feature line. The internal surface of punch 64 is planar. It should be noted that the style feature lines are not necessarily located vertically above seams of assembly of pieces of the covering material, but may be anywhere.

According to the described embodiments, it is provided to shape the foam of the cover element on either side of a style feature line defined by a rib in the mold matrix. Thus, the shape (and the thickness) of the foam is defined on either side of the matrix rib. More particularly, ribs on either side of the line opposite the matrix rib are provided in the punch, to compress the foam on the two sides of the matrix rib. Of course, the respective roles of the matrix and of the punch may be inverted.

As compared with known foam part forming techniques, the fact of providing a compression of the foam on either side of the style feature line facilitates the management of the foam thickness around this line, and thus the rendering and the user's experience. In particular, in a seat, the experience of the passenger sitting on the seat is particularly important, which problem is not posed in the context of the forming of other pieces of vehicle equipment such as, for example, instrument panels.

Figure 7:
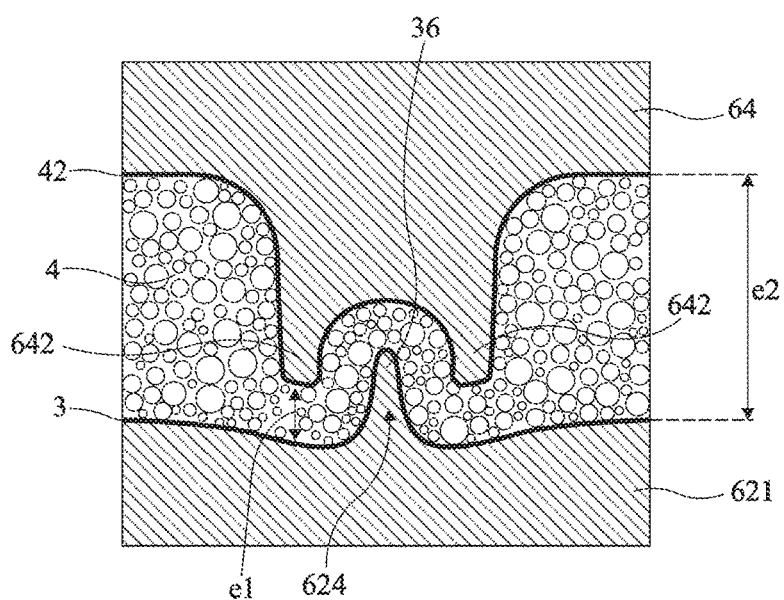
FIG. 7 is a partial cross-section view illustrating a detail of an embodiment of a mold for forming a cover element according to the second aspect.

FIG. 7 is a partial cross-section view illustrating a detail of an embodiment of a mold for forming a cover element. This drawing illustrates the mold in closed position at the level of a style feature line.

It is provided, at the level of all or part of the style feature lines, for the internal surface of the punch to comprise ribs 642 protruding on either side of the style feature line, and thus on either side of the line opposite rib 624 of matrix 62. This improves the forming of the style feature lines.

The thickness of foam 4 above rib 624 (spacing e1 between the punch and the matrix in line with rib 624) and under each rib 642 (between the punch and the matrix vertically in line with each rib 642) is smaller than the foam thickness (spacing e2 between the punch and the matrix) in the rest of the cover element, which improves the aspect and the occupant's experience. For example, spacing e1 is in the approximate range from 2 to 3 mm, while spacing e2 is in the approximate range from 2.5 mm and 13 mm.

The spacing between ribs 642 and the curvature of the internal surface of punch 64 are selected according to the desired aspect and so as not to weaken the cover element. In particular, this enables to improve the management of the profile of the cover element at the edges of the style feature line (the angle on either side of the style feature line). In the example of FIG. 7, this corresponds to easing the forming of the radius of curvature on either side of the bottom of rib 624.

Figure 8:
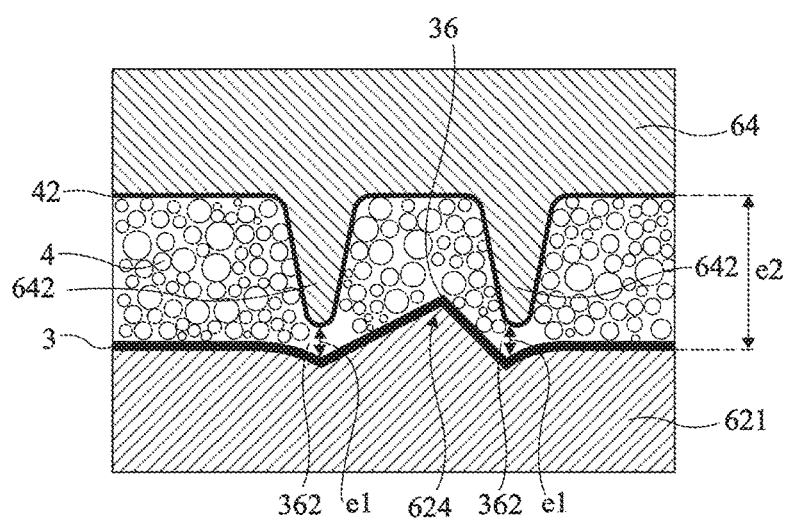
FIG. 8 is a partial cross-section view illustrating a detail of another embodiment of a mold for forming a cover element according to the second aspect.

FIG. 8 is a partial cross-section view illustrating a detail of another embodiment of a mold for forming a cover element. As for FIG. 7, this drawing illustrates the mold in closed position at the level of a style feature line. As compared with the embodiment of FIG. 7, the shape of rib 624 of matrix 62 is different and slight edges 362 are desired to be formed on either side of recess 624 defining the style feature line. Further, the thickness of foam 4 is only decreased at the level of ribs 642. The spacings between the punch and the matrix under ribs 642, and between the punch and the matrix above rib 624 are, as in the embodiment of FIG. 7, smaller than spacing e2 between the punch and the matrix on either side of ribs 642 outside of the style feature line. However, the spacing between the punch and the matrix above rib 624 is different (here, greater) than spacing e1 and under ribs 642.

As in the embodiment of FIG. 7, ribs 642 facilitate the management of the profile of the cover element at the edges of the style feature line. In the example of FIG. 8, this enables to more clearly mark the cover element.

Figure 9:
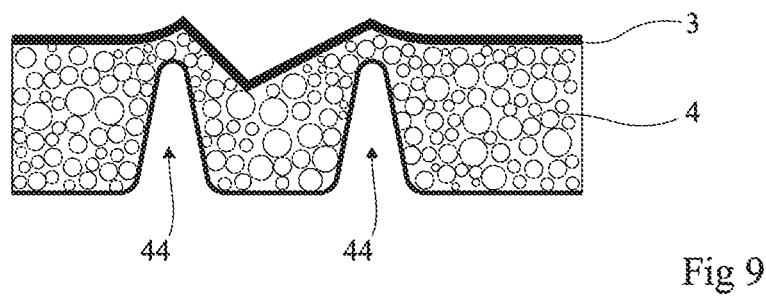
FIG. 9 is a partial cross-section view of a cover element obtained with the mold of FIG. 8.

FIG. 9 is a partial cross-section views of a cover element obtained with the mold of FIG. 8. The polymerizing of foam 4 in the mold generates, on the back side of foam 4, counterforms 44 of ribs 642 of punch 64.

In certain applications, it is desirable not to have these counter-forms, for example, to improve and homogenize the mechanical resistance of the cover element.

Figure 10A:
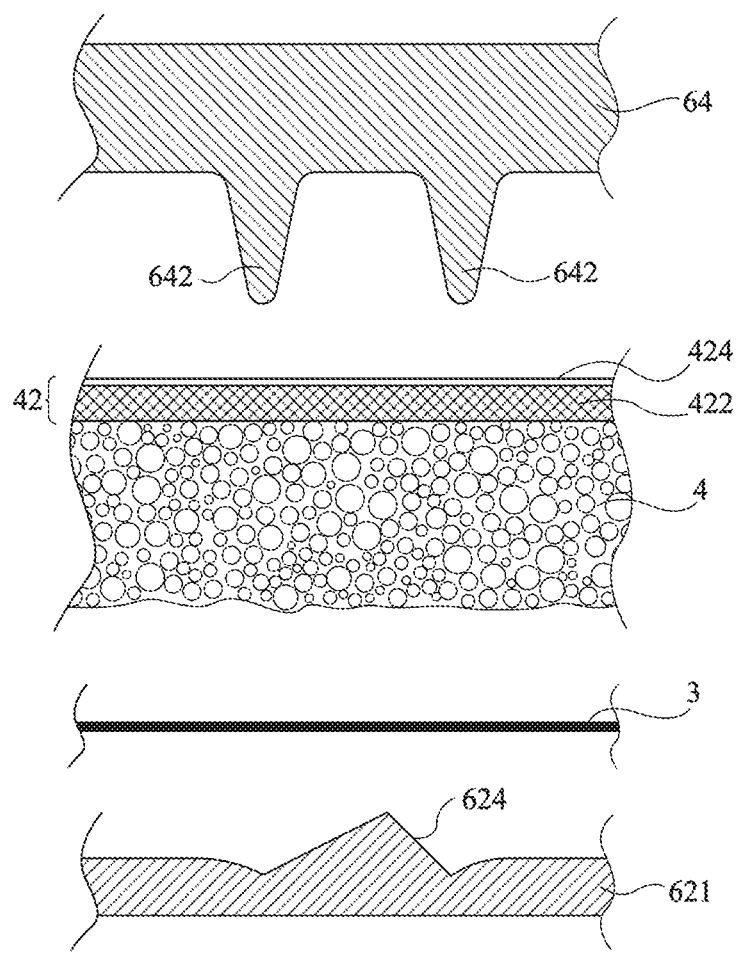
FIGS. 10A, 10B, and 10C are partial cross-section views illustrating steps of forming a cover element according to another embodiment implementing the second aspect.
Figure 10B:
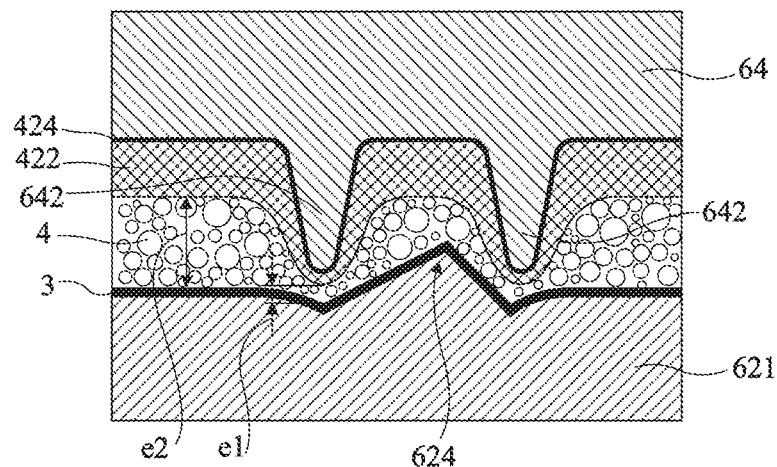
Figure 10C:
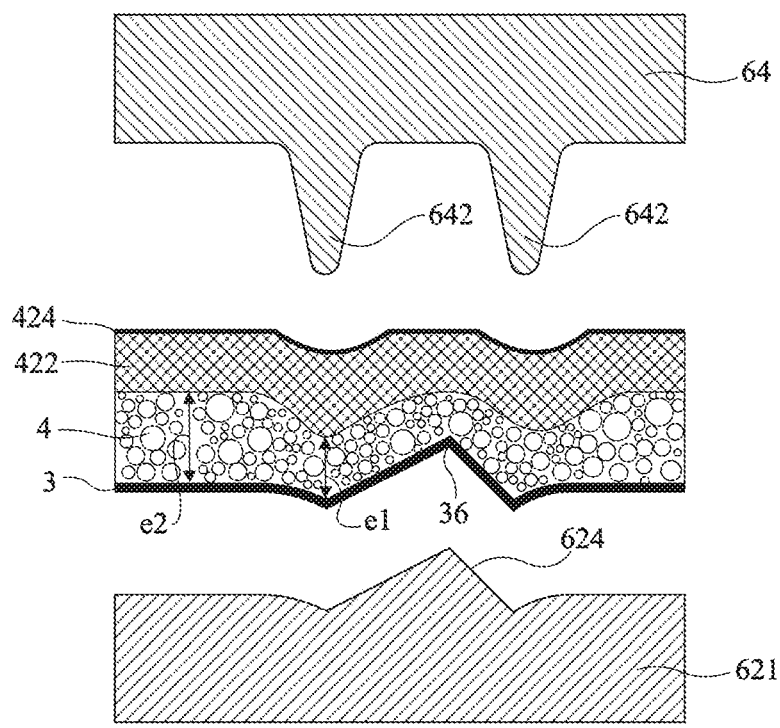

FIGS. 10A, 10B, and 10C are partial cross-section views illustrating steps of forming a cover element according to another embodiment aiming at decreasing counter-forms in the cover element.

FIG. 10A is an exploded cross-section view of plate 621 of matrix 62, of cap 3, of the assembly of foam 4 and of substrate 42, and of punch 64.

Matrix 62 and punch 64 are of the type illustrated in FIG. 8. Although, in this example, cap 3 is of the type illustrated in FIG. 3, the described embodiments also apply to a cap 3 provided with a barrier layer 34.

According to this embodiment, a substrate 42 comprising a slit foam layer 422 having foam 4 in the liquid state (not fully polymerized) sprayed onto it (step of FIG. 5A) is provided. Optionally, a polyethylene film 424 may be used. However, layer 422 being made of slit foam, it is already sufficiently resistant to be used by itself as a substrate.

FIG. 10B is a cross-section view of the closed mold. Layer 422 deforms and crushes above ribs 642, while leaving a thickness e1 of foam 4 between layer 422 and cap 4.

FIG. 10C is a cross-section view during the mold opening. Once foam 4 has polymerized, thickness e1 at the level of ribs 642 is set (as in the embodiment of FIGS. 7 and 8). However, by resilience, layer 422 recovers its original thickness. This results is an approximately regular general shape of the cover element.

This embodiment preserves the desired aspect and feel at the level of the style feature line with a thickness of foam 4 locally different on either side of line 36, while approximately uniformizing the back side of the cover element, and thus the mechanical behavior of the assembly.

Figure 11:
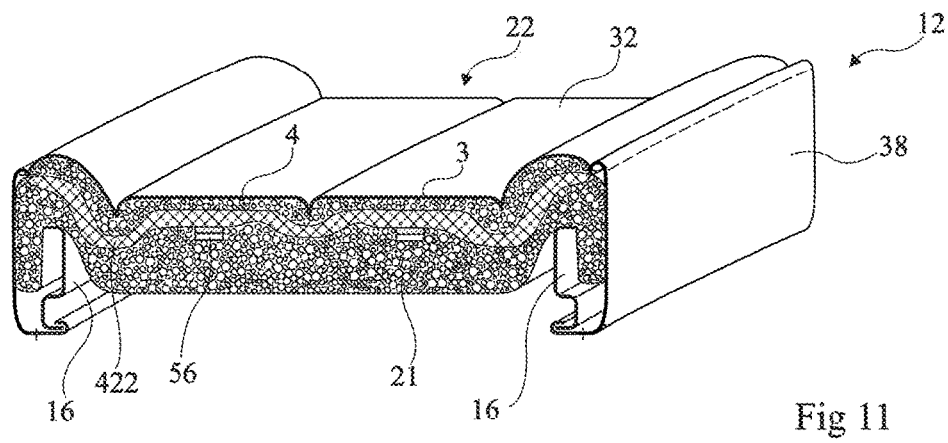
FIG. 11 is a simplified perspective cross-section view of a seat bottom piece provided with a cover element formed according to the method of FIGS. 10A to 10C, at the end of the manufacturing.

FIG. 11 is a simplified perspective cross-section view of a seat bottom piece 12 provided with a cover element 22 formed according to the method of FIGS. 10A to 10C, at the end of the manufacturing.

The seating cushion, formed of support block 21 and of cover element 22, is shown to be assembled on a slide rail mechanism 16. Lateral tucked panels 38 cover, preferably with the covering material, the edges of the seat bottom piece. Cover element 22 thus comprises a substrate 42 comprising a slit foam layer 422.

This embodiment arbitrarily takes the example of cap 3 of FIG. 3 (absence of a barrier layer 34) and illustrates the presence of hook-and-loop straps 56 at the back side of the cover element.

Once this cover element has been obtained, it is associated with a support block, which may for example be formed as described in above-mentioned document WO-A-2010/010281. An advantage of the described embodiment is that they improve the forming of style feature lines and the seat occupant's experience.

An advantage of the described embodiments is that the foam thickness may be different according to the padding areas, the thickness matching being performed by means of mold 6. As a specific embodiment, the foam may have a thickness in the range from 5 to 40 according to areas.

Figure 12A:
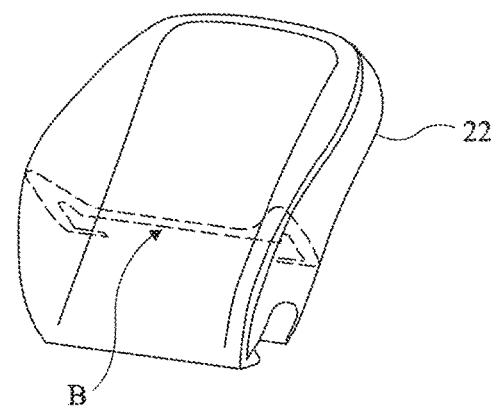
FIGS. 12A and 12B are respective perspective and cross-section views of another example of a cover element.
Figure 12B:
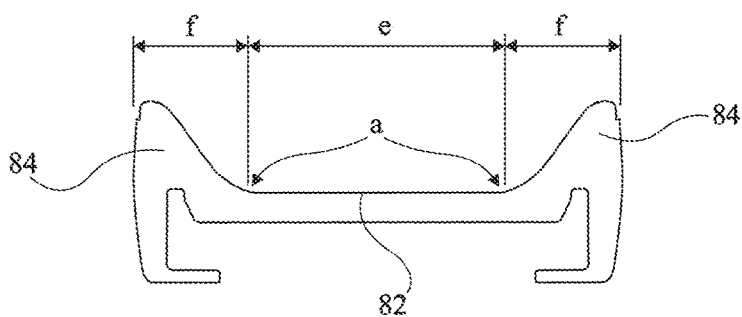

FIGS. 12A and 12B are respective perspective and cross-section views of another example of a cover element. FIG. 12B is a cross-section identified as B in FIG. 12A.

According to the embodiment, the cover element is a backrest cover element defining a bottom 82 and sides 84. The dimensions of the side and of the backrest are selected so that the cover element and in particular its bottom are pressed against a support block (not shown) without it being necessary to provide hook-and-loop straps or the like. As illustrated in FIG. 14B, the critical dimensions on this regard are width e of bottom 82, width f of sides 84, and radius of curvature a between the bottom and the edges.

Various embodiments have been described. Various alterations and modifications will occur to those skilled in the art. In particular, although the embodiments have been described in relation with an example of upholstery for a seat bottom piece, they more generally apply to any seat element. Further, the distribution between the thickness provided to foam support block 21 and that of cover element 22 may vary according to seat ranges. Further, the practical implementation of the described embodiments is within the abilities of those skilled in the art based on the functional indications given hereabove.

The invention claimed is:

1. A method of forming at least one style feature line in a cover element for seat upholstery, comprising the steps of:
    depositing foam in a viscous state on a support element to create an assembly comprising the support element and the foam in the viscous state;
    polymerizing the foam by placing the assembly comprising the support element and the foam in the viscous state in a mold having a matrix and a punch, the matrix comprising one or more matrix ribs, each of the one or more matrix ribs for defining a style feature line and the punch comprising two punch ribs for each of the one or more matrix ribs, each of the one or more matrix ribs aligned between the two punch ribs.

2. The method of claim 1, wherein the support element and the foam extend on either side of each of the one or more matrix ribs of the matrix.

3. The method of claim 1, wherein the foam extends on either side of the punch ribs of the punch.

4. The method of claim 1, wherein the support element and the foam fill an entire cavity of the mold at the level of the punch ribs.

5. The method of claim 1, wherein the support element and the foam fill an entire cavity of the mold.

6. The method of claim 1, wherein said assembly is placed in the mold with the support element on the matrix side.

7. The method of claim 1, wherein, when the mold is closed, a ridge of each of the one or more of the matrix ribs of the matrix is between the punch ribs of the punch.

8. The method of claim 1, wherein a first spacing between the punch and the matrix in line with the two punch ribs of the punch surrounding each of one or more matix ribs of the matrix is smaller than a second spacing between the punch and the matrix outside of the two punch ribs of the punch.

9. The method of claim 8, wherein the first spacing between the punch and the matrix between the two punch ribs of the punch is constant.

10. The method of claim 8, wherein a spacing between the punch and the matrix in line with the one or more matrix ribs of the matrix is between the first and second spacings.

11. The method of claim 8, wherein the first spacing is in the approximate range from 2 to 3 mm.

12. The method of claim 8, wherein the second spacing is greater than 2.5 mm.

13. The method of claim 8, wherein the second spacing is in the approximate range from 2.5 to 13 mm.

14. A method of forming at least one style feature line in a cover element for seat upholstery, comprising the steps of:
    depositing foam in a viscous state on a support element to create an assembly comprising the support element and the foam in the viscous state;

placing the assembly comprising the support element and the foam in the viscous state between a matrix and a punch of a mold, the matrix comprising one or more matrix ribs, each of the matrix ribs defining a style feature line and the punch comprising two punch ribs for each of the one or more matrix ribs, each of the one or more matrix ribs aligned between the two punch ribs; and compressing the foam on each side of each of the one or more matrix ribs of the matrix with the punch.

* * * * *